United States Patent
Soffer et al.

(10) Patent No.: US 9,794,496 B2
(45) Date of Patent: Oct. 17, 2017

(54) MEETING ROOM POWER AND MULTIMEDIA CENTER DEVICE

(71) Applicant: High Sec Labs LTD., Yokneam industrial zone (IL)

(72) Inventors: Aviv Soffer, Caesarea (IL); Zohar Vered, Tel Aviv (IL)

(73) Assignee: HIGH SEC LABS LTD, Yokneam Industrial Zone (IL)

( * ) Notice: Subject to any disclaimer, the term of this patent is extended or adjusted under 35 U.S.C. 154(b) by 0 days.

(21) Appl. No.: 14/457,247

(22) Filed: Aug. 12, 2014

(65) Prior Publication Data

US 2016/0050375 A1    Feb. 18, 2016

(51) Int. Cl.
| H04N 7/18 | (2006.01) |
| H04N 5/268 | (2006.01) |
| H04N 5/265 | (2006.01) |
| H04N 5/63 | (2006.01) |
| H04N 21/41 | (2011.01) |
| H04N 21/4363 | (2011.01) |
| G06F 3/14 | (2006.01) |

(52) U.S. Cl.
CPC ............ *H04N 5/268* (2013.01); *G06F 3/14* (2013.01); *G06F 3/1423* (2013.01); *H04N 5/265* (2013.01); *H04N 5/63* (2013.01); *H04N 21/4122* (2013.01); *H04N 21/4363* (2013.01); *G09G 2370/025* (2013.01); *G09G 2370/042* (2013.01); *G09G 2370/20* (2013.01)

(58) Field of Classification Search
USPC ....... 348/180, 184, 441, 462, 552, 558, 563, 348/570, 572, 705, 706, 723, 725, 730, 348/731, 734, 163, 423.1, 231.4, 211.5; 439/68, 131, 373, 538, 620.11, 620.15, 439/620.17, 620.18, 620.19, 620.21; 715/740, 704; 710/303; 381/2, 58, 77
See application file for complete search history.

(56) References Cited

U.S. PATENT DOCUMENTS

| 5,071,367 A | * | 12/1991 | Luu | ............. H01R 13/72 191/12.4 |
| 5,801,785 A | * | 9/1998 | Crump | .............. G06F 3/0338 348/563 |
| 6,104,414 A | | 8/2000 | Odryna | |

(Continued)

FOREIGN PATENT DOCUMENTS

| EP | 1178683 A2 | 2/2002 |
| EP | 2721776 A2 | 4/2014 |
| WO | 2012174475 A2 | 12/2012 |

*Primary Examiner* — Jefferey F Harold
*Assistant Examiner* — Mustafizur Rahman
(74) *Attorney, Agent, or Firm* — Browdy and Neimark, PLLC

(57) ABSTRACT

A meeting room power and multi-media center device having one or more wired or wirelessly connected displays or projectors selectively connected to one or more plurality of connected computers. The device provides user indications of qualified input video signals and enables remote control through wirelessly connected remote controller device. The device also provides AC power jacks and USB power jacks to power and charge various portable devices. Another embodiment of the current invention provides similar device further having video processing function to display multiple video sources simultaneously on one or more displays or projectors.

35 Claims, 8 Drawing Sheets

(56) References Cited

U.S. PATENT DOCUMENTS

Figure 1:
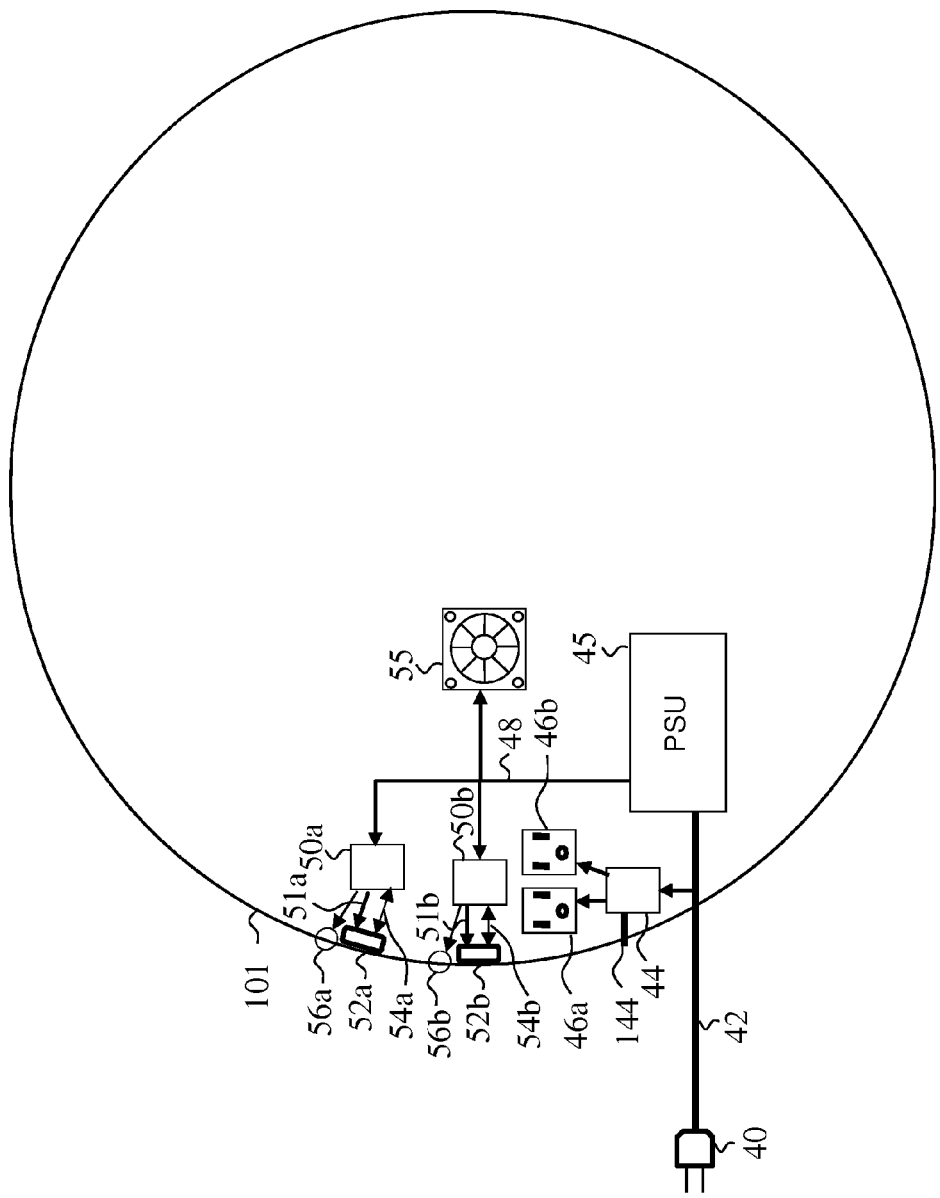

| | | | | |
|---|---|---|---|---|
| 6,452,923 | B1* | 9/2002 | Gerszberg | H04N 21/2143 370/352 |
| 6,722,917 | B2* | 4/2004 | Huang | H01R 25/003 439/501 |
| 7,025,627 | B2* | 4/2006 | Rosenthal | H01R 25/003 439/142 |
| 7,223,122 | B2* | 5/2007 | Mori | H01R 13/447 439/501 |
| 7,417,850 | B1 | 8/2008 | Pulido | |
| 7,467,971 | B2* | 12/2008 | Lin | H01R 13/72 191/12.2 R |
| 7,887,341 | B2* | 2/2011 | Liao | 439/131 |
| 7,907,208 | B2* | 3/2011 | Chiba | 348/441 |
| 8,769,172 | B2 | 7/2014 | Soffer | |
| 2003/0025830 | A1* | 2/2003 | Perry | H04N 5/45 348/441 |
| 2004/0177264 | A1* | 9/2004 | Anson | G06F 21/83 726/34 |
| 2005/0164545 | A1* | 7/2005 | Rosenthal | H01R 25/003 439/501 |
| 2006/0242458 | A1* | 10/2006 | Feldman | G06F 11/1441 714/14 |
| 2006/0274484 | A1* | 12/2006 | Mori | H01R 25/003 361/601 |
| 2007/0086724 | A1* | 4/2007 | Grady | H04N 5/765 386/230 |
| 2007/0132881 | A1* | 6/2007 | Tani | 348/441 |
| 2007/0260785 | A1* | 11/2007 | Chen | G06F 3/1423 710/62 |
| 2007/0273759 | A1* | 11/2007 | Krupnick et al. | 348/45 |
| 2008/0062121 | A1* | 3/2008 | Huang | G06F 3/023 345/156 |
| 2008/0090434 | A1* | 4/2008 | Lin | H01R 13/60 439/131 |
| 2008/0143892 | A1* | 6/2008 | Lytell | 348/837 |
| 2008/0211310 | A1* | 9/2008 | Jitaru | H01R 31/065 307/72 |
| 2008/0284913 | A1* | 11/2008 | Yamada | H04N 5/4403 348/563 |
| 2009/0125222 | A1* | 5/2009 | McCullough et al. | 701/120 |
| 2010/0299712 | A1* | 11/2010 | Austin et al. | 725/81 |
| 2011/0032423 | A1* | 2/2011 | Jing et al. | 348/552 |
| 2011/0095611 | A1* | 4/2011 | Yeh et al. | 307/66 |
| 2011/0113166 | A1* | 5/2011 | Hung et al. | 710/63 |
| 2011/0208963 | A1 | 8/2011 | Soffer | |
| 2011/0211118 | A1* | 9/2011 | Han | G06F 3/1431 348/564 |
| 2011/0317071 | A1* | 12/2011 | McRae | 348/558 |
| 2012/0256484 | A1* | 10/2012 | Kemp | 307/22 |
| 2013/0050084 | A1 | 2/2013 | Soffer | |
| 2013/0083249 | A1* | 4/2013 | Nonomura | H04N 5/64 348/725 |
| 2013/0083250 | A1* | 4/2013 | Hiratomo | H04N 5/64 348/725 |
| 2013/0176494 | A1* | 7/2013 | Takemoto | H04N 5/268 348/563 |
| 2013/0187459 | A1* | 7/2013 | Green | H02J 3/00 307/31 |
| 2013/0208190 | A1* | 8/2013 | Slothouber | H04N 21/44222 348/731 |
| 2013/0329136 | A1 | 12/2013 | McClymonds et al. | |
| 2014/0053256 | A1 | 2/2014 | Soffer | |
| 2014/0154994 | A1* | 6/2014 | Mason | H04N 21/43637 455/66.1 |
| 2015/0032918 | A1* | 1/2015 | Zhang | G06F 13/102 710/62 |
| 2015/0040158 | A1* | 2/2015 | Kamida | H04N 21/42228 725/38 |
| 2015/0356045 | A1* | 12/2015 | Soffer | G06F 13/4221 710/303 |

* cited by examiner

Figure 1 (Prior-Art)

MEETING ROOM POWER AND MULTIMEDIA CENTER DEVICE

FIELD OF THE INVENTION

The present invention relates to a device that provides power to portable devices and universal video-audio interface to a connected display or projector.

More specifically a device that provides AC power and USB power through multiple jacks and video-audio connectivity through multiple jacks (for example: VGA, HDMI, DVI, DisplayPort, MHL and USB 3.0). User controls and indicators enable selection of one or more sources to be displayed on connected display or projector.

BACKGROUND OF THE INVENTION

Meeting Room Power Centers are available for example from Belkin International, Inc. 12045 E. Waterfront Drive Playa Vista, Calif. 90094 US. The Belkin Meeting Room Power Center, e.g. MEETING ROOM POWER CENTER B2E025-06-BLK, offers surge-protected electrical outlets and USB charging ports to keep everyone's business-critical devices powered up, no matter how long the meeting lasts. Four surge outlets and eight USB charging ports supply simultaneous power to multiple computing devices and peripherals, from tablets and Smartphones to laptops and projectors.

Meeting room connecting boxes are available for example from ALTINEX, Inc. 592 Apollo Street Brea, Calif. 92821, USA. For example USAALTINEX Tilt 'N Plug® Tabletop Interconnect Box allows a user to customize his conference table to accommodate growing technological demands. All wiring and cable networking is done underneath the table for better, cleaner, and hidden cable management.

Power and Data Distribution Unit is available for example from Electriduct, Inc; 6250 NW 27th Way; Ft Lauderdale, Fla. 33309; USA. The MHO Power and Data Distribution Unit provides power and data connectivity to desk or workstation with. The MHO Power/Data Center houses 2 voice/data ports and 2 simplex 3 prong power outlets. Each tabletop power and data center comes with the option of a 6 or 10 foot 15 amp power cord, as well as a voice/data adapter kit that allows the unit to accept couplers and jacks.

Sharing display and other peripheral devices by several computers is known in the art. For example, KVM (Keyboard, Video, Mouse) units are used to allow one user to use several computers. Such units are discussed for example in:

US 20110208963, "secured kvm system having remote controller-indicator";

US 20130050084 "Secure kvm system having multiple emulated edid functions";

U.S. Pat. No. 8,769,172 "Secure KVM device ensuring isolation of host computers:

US 20140053256 "User authentication device having multiple isolated host interfaces";

all to the inventor of the current invention.

Some general background may be found in the following prior art publications:

EP1178683A2 "Hub for a video conferencing system", to Bernstein, et al;

EP2721776A2 "Communication hub for presenting audio-visual data from electronic devices", to Diner, et al;

U.S. Pat. No. 6,104,414 "Video distribution hub", to Odryna, et al;

U.S. Pat. No. 7,417,850 "Self contained power and signal distribution system for computers and the like", to Pulido; and US20130329136 "Video switch", to Rayan et al.

SUMMARY OF THE EMBODIMENTS

It is an object of the current invention to provide a meeting room power and video center device comprising:

a housing;

an AC power input, to connect said housing to a power mains;

a plurality of AC jacks on the outside of said housing, coupled to said AC power input;

an AC to DC power supply module, coupled to said AC power input;

a plurality of DC charging jacks, on the outside of said housing, coupled to said AC to DC power supply module;

a plurality of video input ports on the outer surface of said housing;

at least one display port, to transmit video signals to an external display; and a video processor, coupling at least one video signal from at least one of said plurality of video input ports to said at least one display port.

In some embodiments the video processor is a video switch, selectively switching one video signal from at least one of said plurality of video input ports to said at least one display port.

In some embodiments the charging jacks are USB jacks.

In some embodiments the meeting room power and video center device further comprises at least one video converter, said at least one video converter is for:

receiving video signal from one of said plurality of video input ports in a first video standard;

converting said video signal in a first video standard to video signal in a different second video standard; and transmitting said video signal in a different second video standard to said video processor.

In some embodiments at least one video converter, is a Mobile High-Definition Link (MHL) to High-Definition Multimedia Interface (HDMI) bridge chip, for converting MHL compatible signals received at the video input port connected to said MHL to HDMI bridge chip to HDMI compatible signals.

In some embodiments the video input port connected to said MHL to HDMI bridge chip to HDMI is a mini USB jack, compatible with MHL 3.0 standards.

In some embodiments the meeting room power and video center device further comprises a system controller for controlling said video processor.

In some embodiments the meeting room power and video center device further comprises:

a user selector connected to said system controller for selecting one of said plurality of video input ports to be coupled to said at least one display port; and a user indication connected to said system controller, for providing indication of the selected video input port.

In some embodiments: the selector is in a form of a plurality of pushbuttons, wherein:

each pushbutton from said plurality of pushbuttons is located near a corresponding video input port, and said user indication is in a form of a plurality of corresponding LEDs, each corresponding LED from said plurality of corresponding LEDs is located near said a corresponding video input port.

In some embodiments the meeting room power and video center device further comprises:
user indication, for providing indication of status of video signals coupled to said plurality of video input ports; and
  a video detector, wherein:
    said video detector is coupled to said system controller and to said plurality of video input ports for:
      detecting presence of valid video signal in any of said plurality of video input ports;
      reporting to said system controller the presence of valid video signal in any of said plurality of video input ports; and
    causing the activating said user indication, for providing indication of the current status of video signals in said plurality of video input ports.

In some embodiments the meeting room power and video center device further comprises at least one EDID (Extended Display Identification Data) emulator,
  said at least one EDID emulator is coupled to
  said at least one display port, and coupled to
  said plurality of video input ports,
  said at least one EDID emulator is for:
    receiving EDID content from a display connected to said at least one display port; and
    emulating a standard EDID EEPROM (Electrically Erasable Programmable Read-Only Memory) to enable continuous access to said EDID content of said display connected to said at least one display port from any one of said plurality of video input ports.

In some embodiments at least one of said video input ports is connected to a docking controller to support at least one protocol selected from the group consisting of: USB 3.0, Thunderbolt, Lightning, and DockPort.

In some embodiments at least one of said video input ports is connected to a wireless link receiver, to wirelessly receive input video signal.

In some embodiments wireless link receiver enables video input from a portable device using at least one video protocol selected from the group consisting of: DLNA (Digital Living Network Alliance), Miracast, MIMO (multiple-input and multiple-output), WHDI (Wireless High Definition Interface), Airplay, and WirelessHD.

In some embodiments the meeting room power and video center device further comprises a remote control receiver, connected to said system controller, wherein said remote control receiver is wirelessly communicating with a remote controller to receive commands for controlling said video processor.

In some embodiments the remote control further controls at least one external device other than the meeting room power and video center device.

In some embodiments at least one external device other than the meeting room power and video center device is selected from a group consisting of: video display, video projector, audio speakers, audio microphone, video camera, and video camera panning actuator.

In some embodiments: the remote control receiver is a wireless transceiver for providing bi-directional communication with said remote controller to receive status data from said system controller; and
  said remote controller further comprises a display to display information derived from said status data from said system controller.

In some embodiments at least one display port is a wireless video transmitter, wirelessly transmitting video signals to a matching video receiver.

In some embodiments the meeting room power and video center device further comprises a video rescaler, connected between said video processor and said at least one display port,
  said video rescaler is for one of:
    video up-scale; or
    video down-scale
  of video format of video signals received from said video processor, to match the video format of video signals compatible with a display coupled to said at least one display port.

In some embodiments when at least two valid video signals are present in two video input ports,
  said video processor integrates video signals from at least a first video input port and a second video input port from said plurality of video input ports, to a composite video signal presented at said at least one display port.

In some embodiments the composite video signal presented at said at least one display port is a picture in picture (PIP) display comprising at least a first picture and a second picture, wherein:
  said first picture is overlaid with said second picture,
  said first picture is derived from video signal from said first input port, and
  said second picture is derived from video signal from said second input port.

In some embodiments the video processor further generates at least one video background image when at least one of the conditions is met:
  no video input was selected;
  the selected video input is not connected to a valid video signal; or
  no valid video signal is presented in any one of said plurality of video input ports.

In some embodiments the video processor further generates a video image presenting system information.

In some embodiments the video image presenting system information comprises information selected from the group consisting of: listing the video inputs at which valid signals are available, listing video signal type, listing of the available displays, listing display types.

In some embodiments the video image is displayed for a short time duration when at least one change of configuration is made, wherein said short time duration is between 0.2 second to 45 second.

In some embodiments the change of configuration is selected from a group consisting of: connecting a display, disconnecting a display, connecting a video input to a video source, disconnecting a video input to a video source, and changing the selected video input source.

In some embodiments the meeting room power and video center device further comprises a network port connected to said system controller,
  wherein data received by said system controller via said network port is used for generating an image to be presented at said at least one display port.

In some embodiments the meeting room power and video center device further comprises an audio multiplexer, coupled to a plurality of plurality of audio input channels, and having at least one output audio channel,
  said audio multiplexer is for:
    receiving input audio signals from said plurality of audio input channels,
    and for generating output audio signal based on at least one of said input audio signals, to be presented in said at least the audio output channel of said audio multiplexer.

In some embodiments the audio multiplexer is an analog audio switch, switching one selected audio input channel from said plurality of said input audio channels into said audio output channel.

In some embodiments the meeting room power and video center device further comprises an audio injector, connected to said at least one audio output channel, for injecting audio signals presented at said audio output channel into the video signal to be presented at said at least one display port.

In some embodiments the audio injector injects digital audio data into digital video stream to be presented at said at least one display port.

In some embodiments the meeting room power and video center device further comprises:
 a first device emulator connected to a first charging jack of said a plurality of DC charging jacks;
 a second device emulator connected to a second charging jack of said a plurality of DC charging jacks;
 an arbiter, coupled to said first device emulator and to said second device emulator; and
 at least one mass storage component, wherein:
  said first device emulator enables data exchange of a first mobile computing device coupled to said first charging jack with said arbiter,
  said second device emulator enables data exchange of a second mobile computing device coupled to said second charging jack with said arbiter, and wherein
  said arbiter presents said at least one mass storage component as an external disk drive to both said first mobile computing device and to said second mobile computing device.

In some embodiments files may be written to, and read from said at least one mass storage component by said first mobile computing device and by said second mobile computing device.

In some embodiments at least one mass storage component is internal to said housing.

In some embodiments the meeting room power and video center device further comprises at least one external port for connecting an external mass storage component,
 wherein said arbiter presents said at least one external mass storage component as an external disk drive to both said first mobile computing device and said second mobile computing device.

In some embodiments the arbiter comprises a file reader for reading a file stored in said external mass storage component and convert data in said file stored in said external mass storage component to video images to be presented at said at least one display port.

In some embodiments the housing comprises:
a base, said base is having:
 said plurality of AC jacks exposed on the outside of said base; and
 said plurality of DC charging jacks, exposed on the outside of said base; and a turret,
 said turret is having said a plurality of video input ports exposed on the outer surface of said housing,
 wherein said turret is connected to said base such that said turret can rotate with respect to said base.

In some embodiments at least one of said plurality of video input ports is coupled to said AC to DC power supply module to provide charging of a mobile computing device connected to said at least one of said plurality of video input ports coupled to said AC to DC power supply module.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 illustrates a high-level functional block-diagram of a typical prior-art meeting room power center having multiple powered AC jacks and USB jacks.

Figure 2:
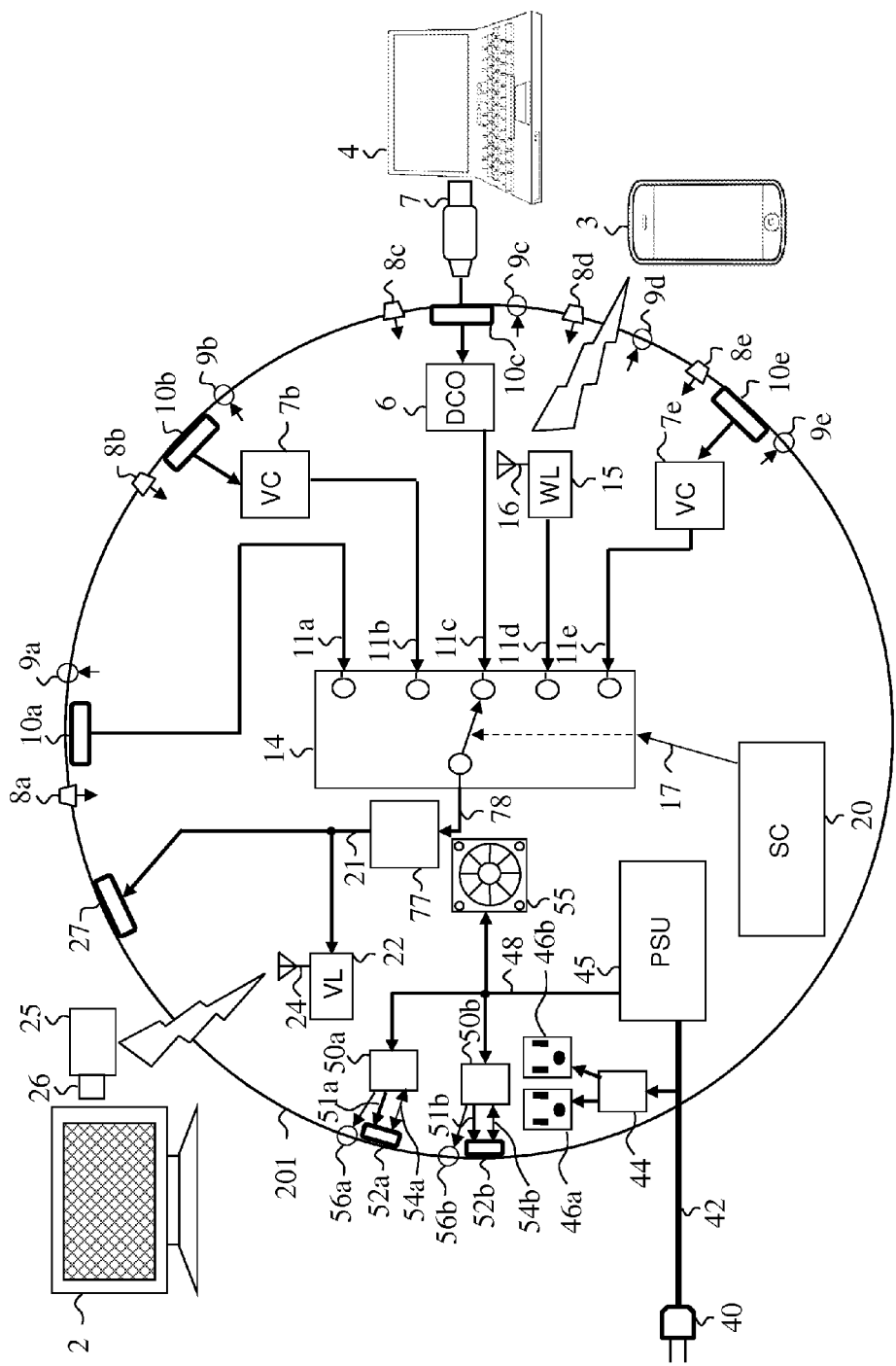

FIG. 2 schematically illustrates a high-level functional block-diagram of an exemplary embodiment of the current invention having multiple powered AC jacks and USB jacks and multiple video input sources selectable by the user.

Figure 3:
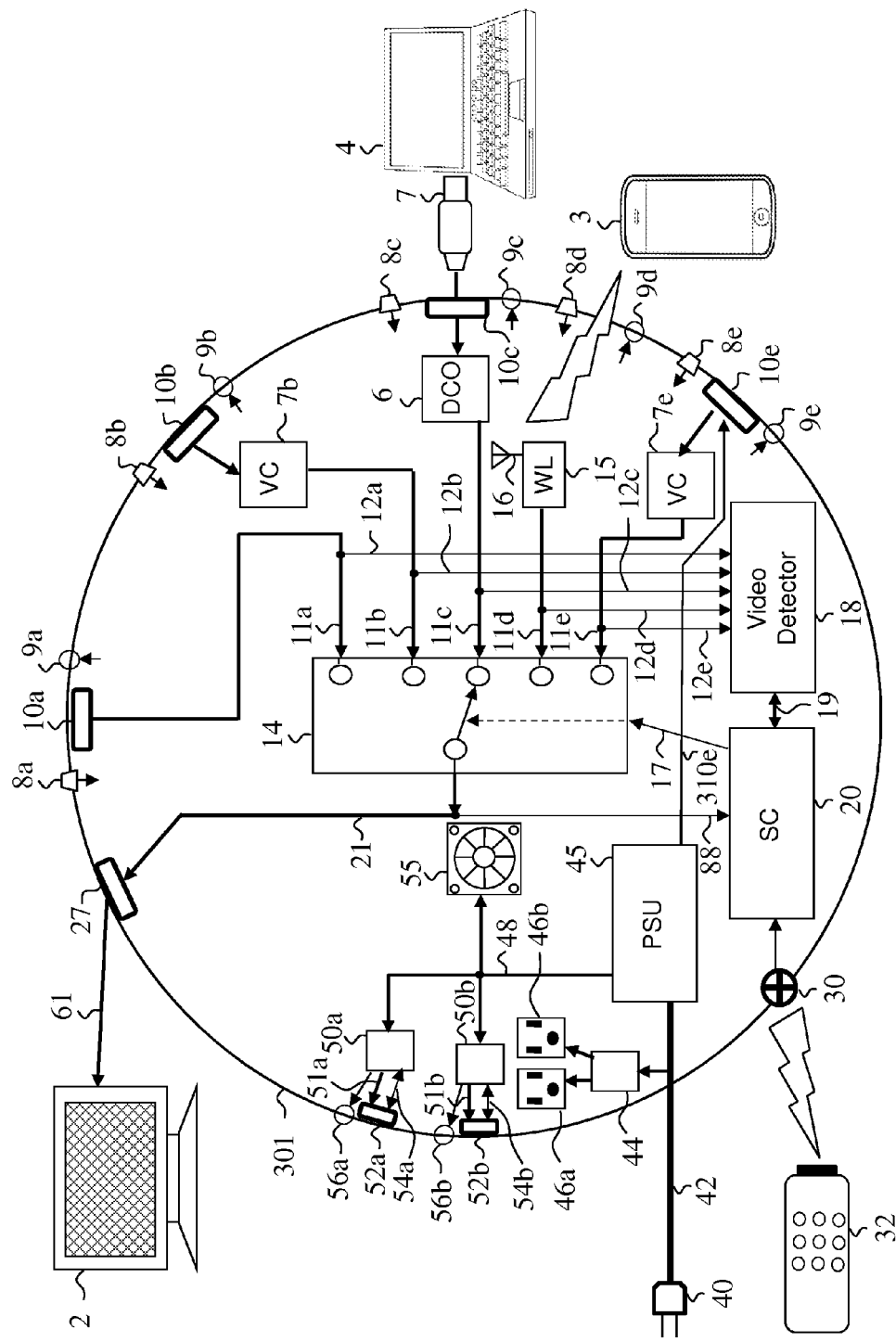

FIG. 3 schematically illustrates another high-level functional diagram of an exemplary embodiment of the current invention that is similar to the device shown in FIG. 2 above, but it is further having video detector and remote controller functions.

Figure 4:
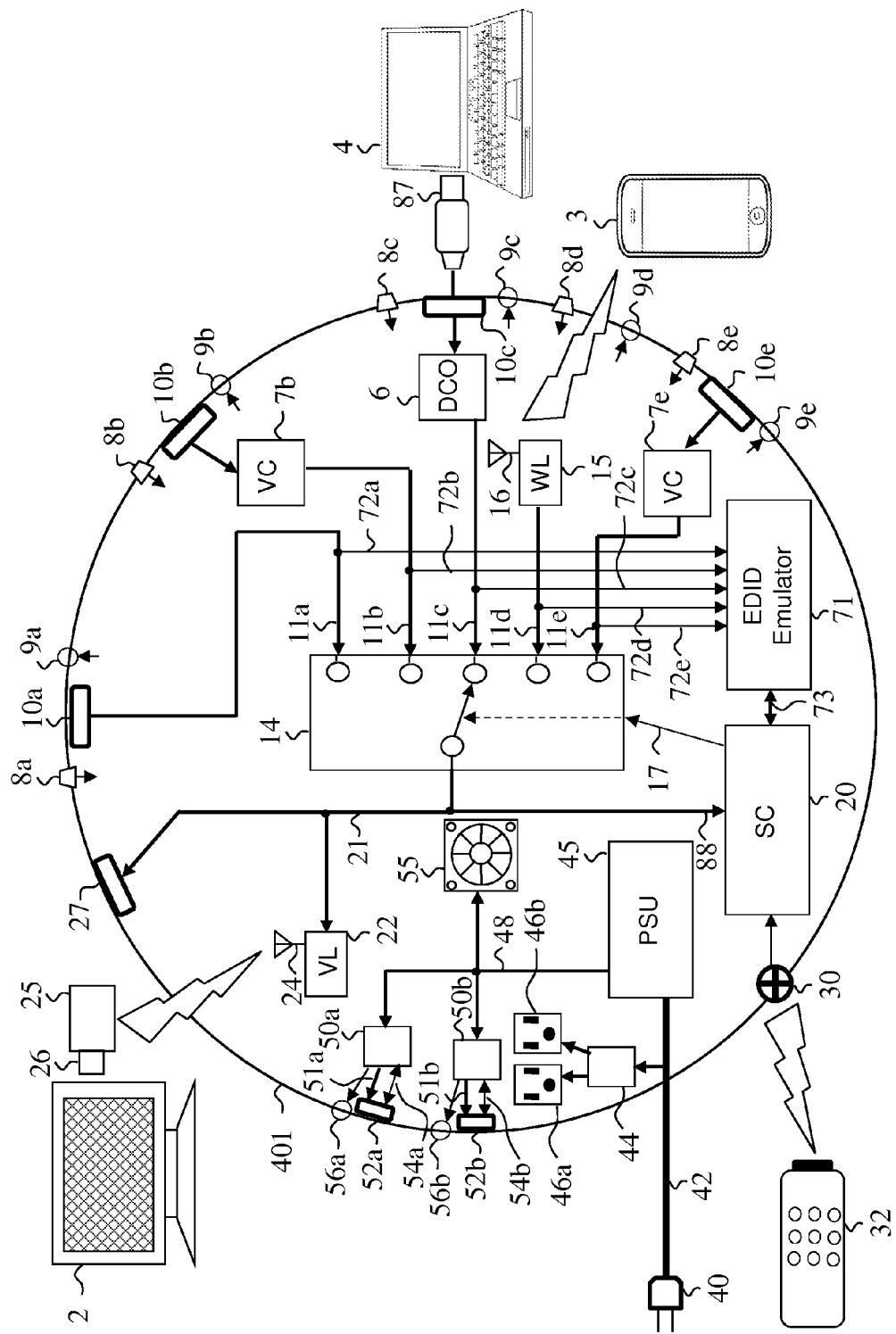

FIG. 4 schematically illustrates yet another high-level functional diagram of an exemplary embodiment of the current invention that is similar to the devices shown in previous figures, 2 and 3 but it is further having an EDID emulator function.

Figure 5:
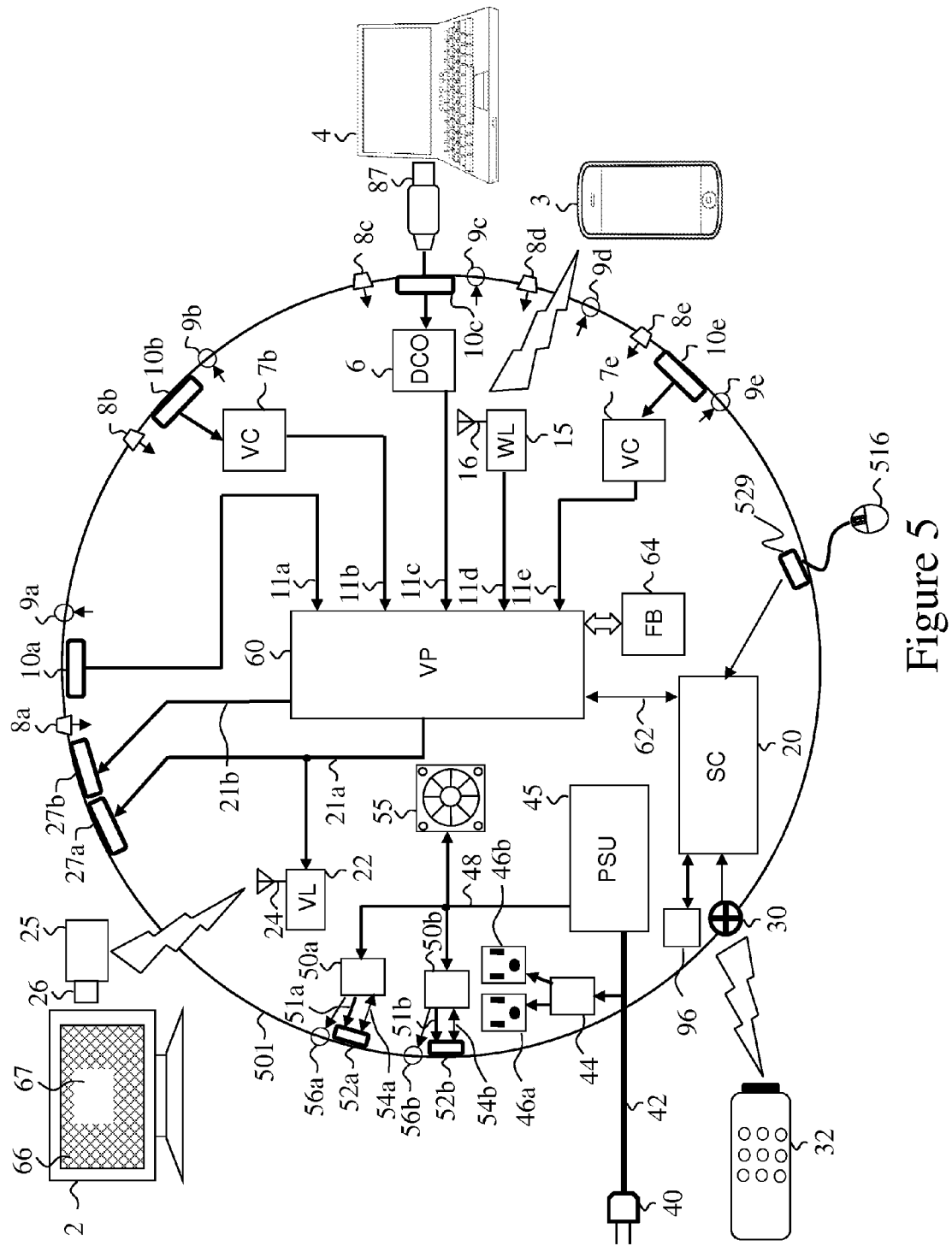

FIG. 5 schematically illustrates yet another high-level functional diagram of an exemplary embodiment of the current invention that is similar to the device shown in FIGS. 2 to 4 above, but it is further having a video processor function.

Figure 6:
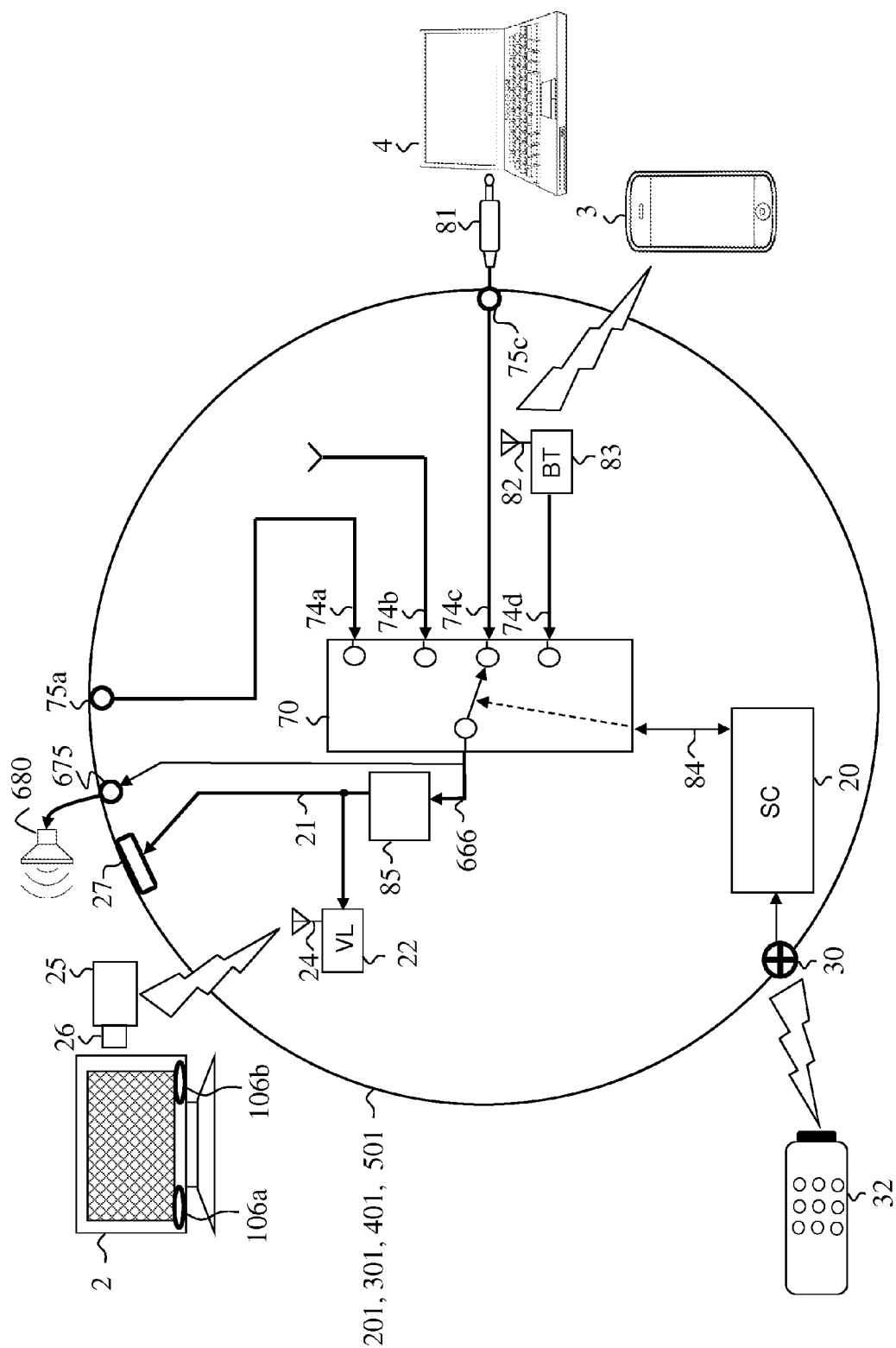

FIG. 6 schematically illustrates a high-level functional diagram of an audio sub-system of the preferred embodiment of the current invention shown in FIGS. 2 to 5 above.

Figure 7:
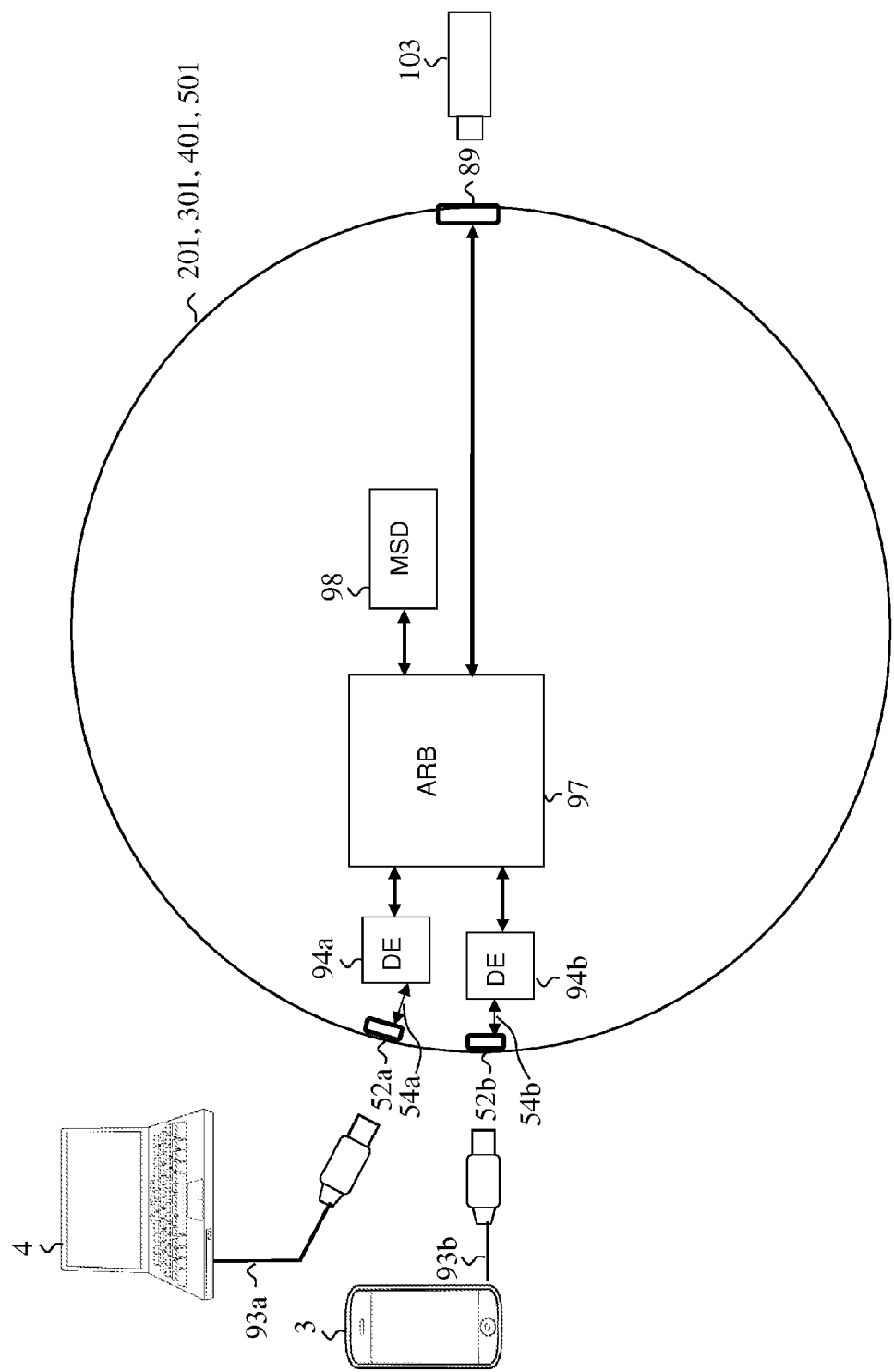

FIG. 7 schematically illustrates a high-level functional diagram of a file transfer sub-system of the preferred embodiment of the current invention shown in FIGS. 2 to 5 above.

Figure 8:
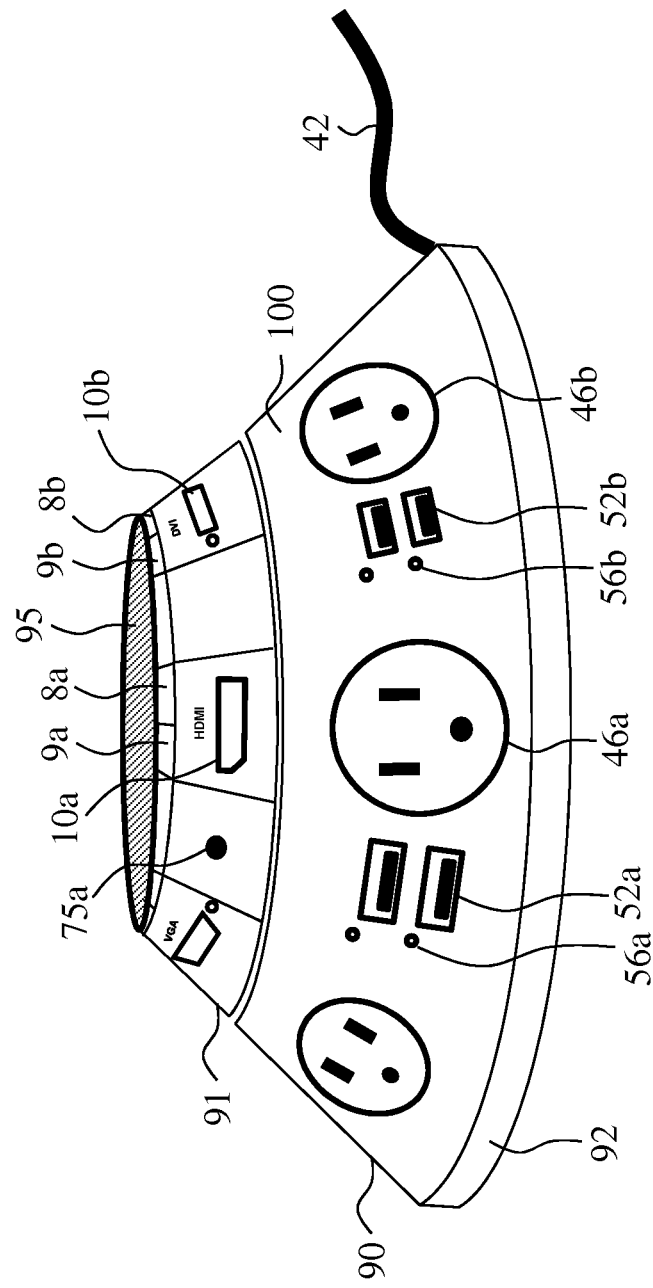

FIG. 8 illustrates an external view of a preferred embodiment of the current invention shown in FIGS. 2 to 5 above.

DETAILED DESCRIPTION OF THE DRAWINGS

Before explaining at least one embodiment of the invention in detail, it is to be understood that the invention is not necessarily limited in its application to the details set forth in the following description or exemplified by the examples.

The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand alone programs, may be incorporated as subroutines in an operating system, may be functions in an installed software package, and the like.

FIG. 1 schematically illustrates a prior-art meeting room power center device 101 having multiple USB (Universal Serial Bus) charging jacks 52x and AC (Alternate Current) power jacks 46x.

In this, and other figures, similar elements may be marked with a number and a letter, for example charging jacks 52a, 52a, and 52c. The letter "x" following a number may generically stand as any of such letter.

Power to the device 101 is supplied from nearby mains outlet via mains plug 40, mains power cable 42 and AC protection circuitry 44. Optionally, AC protection circuitry 44 is a circuit breaker having a reset lever or button 144. For drawing clarity, reset lever or button 144 do not appear in the following figures.

AC protection circuitry 44 is typically comprises of one or more of the following function:
1. Over-voltage protection circuitry;
2. Over-current protection circuitry or Circuit breaker;
3. Over-temperature protection circuitry; and
4. In-rush current or pulse protection circuitry.

AC to DC (Direct Current) power supply module (PSU) 45 is connected to the AC protection circuitry 44 or directly to the mains power cable 42 to covert high voltage AC input into low voltage stabilized DC voltage (typically 5V to enable direct connection to USB jacks). PSU 45 is powering DC lines 48 that used to enable high-current power distribution to consumers inside and outside of device 101.

USB Type-A jacks 52a and 52b are coupled to DC lines 48 via USB port power conditioning circuitry 50a and 50b respectively. Power conditioning circuitry 50x controls the DC power supplied to each 52x USB jack (via USB power line 51x) through predefined settings or through enumeration of the connected device via USB or sensing required charger type through USB lines behavior. Enumeration of the connected device is done via, USB data lines 54x. It may comply with industry standards such as USB Specification, Battery Charging Specification, Rev 1.2 (BC1.2) that defines Charging Downstream Port (CDP) and Dedicated Charging Port (DCP). It may also support Apple devices Sleep-Mode Charging.

USB jacks 52x may further have a status LED (Light Emitting Diode) 56x respectively to provide port charging status to the user. LED may be illuminated when port is powered on or blinking to indicate charging current.

Optional cooling fan 55 is powered from DC lines 48 to force outside air flow into the PSU 45 to cool it down. As the number of USB port increases together with the maximum current that each port may supply, PSU 45 may need to supply currents as high as 25 Amperes. At 80% efficiency, PSU may dissipate 25 Watts of power. Cooling fan 55 may have thermostatic controller to enable quiet and efficient operation based on actual temperatures.

Device 101 enclosure may be shaped as a dish, polygon, cylinder or cone to enable easy access to the jacks from all directions. This type of prior-art device 101 may be optimized for placement at the center of a round or oval board room table. AC jacks 46x may be used to temporarily connect AC loads such as projector, display or laptop charger. USB jacks 52x may be used to charge various portable devices such as Smartphones and tablets.

One major shortfall of such prior-art device is that it is missing audio-visual functionality that is needed in many meeting rooms. Such device specifically addresses the need to provide power solution but it does not address the problem of video and audio connectivity that is required in order to connect a portable device to a large display or to a projector.

FIG. 2 schematically illustrates a high-level functional diagram of an exemplary embodiment of the current invention having both power function similar to the device 101 of FIG. 1 above and audio video functions to support connected projector or display device 2.

Power to the device 201 is supplied from nearby mains outlet for example via mains plug 40, mains power cable 42 and AC protection circuitry 44. Alternatively, an extension cord may connect the mains outlet to the device 201 (or to other devices in the following figures).

Device 201 is having multiple format video input ports 10x to enable connection of wide variety of video devices. All video inputs are connected to the main video switch 14. Video input ports 10x are either directly connected to video switch 14 (for example video input port 10a) or indirectly through various electronic circuitry. Video inputs may also be received wirelessly.

For example:
Video input port 10a may support HDMI (High-Definition Multimedia Interface) video. It can connect directly to HDMI main video switch 14;
Video input port 10b my support DisplayPort video and connected via Video Converter (VC) 7b;
Video input port 10c may support connectivity protocols such as USB 3.0, Thunderbolt, Lightning, or DockPort by connecting input port 10c via a Docking COntroller (DCO) 6. In the depicted non-limiting example, laptop computer 4 is seen connected via USB connector 87;
Wireless video may be received by Wireless Link receiver (WL) 15 coupled to antenna 16 to enable video input from portable device 3 through video protocols such as DLNA (Digital Living Network Alliance), Miracast, MIMO (multiple-input and multiple-output), WHDI (Wireless High Definition Interface), Airplay, WirelessHD etc.; and Video input port 10*e* may support VGA (Video Graphics Array) video and connected to video switch 14 via VC 7*e*.

To avoid cluttering this and other drawings, power lines and power management subsystem associated with video input ports 10*x* and other elements have been omitted.

Video input 10*x* may have internal video functions such as computing platform to run as thin-client or small PC, video streamer and media player. Such function may have an internal WLAN (Wireless Local Area Network) function and antenna.

For example video input line 11*d* may couple the video output of a video streamer instead of Wireless Link receiver (WL) 15. Video streamer is typically an ARM based System On a Chip with volatile and non-volatile memory. ARM is a family of instruction set architectures for computer processors based on a reduced instruction set computing (RISC) architecture developed by British company ARM Holdings. It is also typically equipped with wireless LAN transceiver and antenna 16. Typically it is running an Android OS and capable of browsing the internet and play multiple video and audio formats. However, other technologies for video streamer may be used.

Main video switch 14 is video multiplexer preferably supporting high speed HDMI or DisplayPort signals. It is controlled by System Controller function (SC) 20 via control lines 17 to enable user selection of desired video input.

System Controller function (SC) 20 may be implemented as a microcontroller, FPGA, ASIC or any other programmable circuitry. User inputs are received through user input selector, for example a dial (not seen in this figure) or push buttons 8*x* that are preferably located each near each of the corresponding video input port 10*x*. User indications may be provided by means such as bi-color LEDs 9*x* that are preferably located each near each of the corresponding video input port 10*x*. In an exemplary embodiment, when the user selects a specific video input 10*x* to be displayed, the respective bi-color LED 9*x* is illuminated in blue color. Other color schemes may be used. For drawing clarity, the lines connecting user input selector 8*x* and user indicators 9*x* to SC 20 are not seen in this and the following figures. User indication 9*x* may be in other forms, for example a graphical or alphanumeric display (not seen in this or the following figures).

Output line 21 is connected to main video switch 14 via lines 78, and through optional video rescaler function 77. Optional video rescaler function 77 enables video up-scale or down-scale as needed for each video input format.

Video rescaler 77 output 21 is coupled to external wired display port 27 that used to connected a display or projector 2 using proper cable (not seen in this figure). Another function coupled to the video output lines 21 is the wireless video transmitter (VL) 22 that is coupled to antenna 24. This video transmitter (VL) 22 transmits the selected video output into a matching video receiver, for example video receiver dongle 25 that is coupled through video connector 26 into display or projector 2. Video connector 26 is preferably HDMI type. This arrangement enables wireless support to nearby display or projector thus eliminating the need to wire the meeting room with video cables.

Power to the additional video circuitry may be supplied by the PSU 45.

This exemplary embodiment of the current invention enables meeting room users and guests to connect their portable computing devices to a power source and to enable video and audio presentation. The preferred round enclosure with optional rotating turret enables easy access to the video input connectors from all sides around the meeting room table.

Optional push-button 8*d* is a push-button that enables user selection of the wireless channel (channel d). The corresponding indicator 9*d* is the indicator that indicates that channel "d" is currently selected. In an exemplary embodiment of the current invention, each push-buttons 8*x* is integrated with the corresponding indicator 9*x* in a form of an internal illuminated button. In an optional exemplary embodiment: Green illumination indicates—available at the corresponding video input. No illumination indicates—no video is available at the corresponding video input. Blue illumination indicates—the corresponding video input is currently selected.

FIG. 3 schematically illustrates a high-level functional diagram of an exemplary embodiment of the current invention having additional video detector function to qualify the incoming video input signal.

One of the drawbacks of most current meeting room video systems is the lack of proper user indications. In many cases the user connecting video source to a meeting room for the first time, fails to see video output in the connected display or projector. The reasons for that failure may be due to variety of reasons:

1. Portable device is not generating video output signal;
2. The video output signal generated by the portable device is not compatible with the projector or display;
3. The portable device is not properly connected to the display or projector input;
4. The video cable connected to the portable device is not switched (selected) by the meeting room video systems;
5. The display or projector selected input is not the input connected to the portable device; or
6. The display or projector is turned off or warming up.

To minimize the confusion and prevent complex troubleshooting, the device 301 of the current embodiment of the invention is having video detector function 18 to qualify incoming video signals.

Video detector function 18 is an FPGA, ASIC, DSP, microcontroller or other type of electronic circuitry capable of analyzing the incoming video signals. It is coupled to each one of the video input lines 11*x* through lines 12*x* respectively. Video detector function 18 samples each one of the video inputs to determine its timing and other characteristics such as:
Resolution
Frame rate
Color depth
Audio content
3D The results of this analysis are communicated to the SC 20 via serial lines 19. SC 20 uses these results to provide clear user indications for each input and to enable automatic switching of an active video input. SC 20 is further coupled to video output line 21 through display identification line 88 to enable detection of the connected display or projector 2 EDID (Extended Display Identification Data) content. Such content may be compared by the SC 20 to determine if input video signal is matching display or projector 2 supported video formats.

For example, the following indications may be provided to the user through bi-color LEDs 9*x*:
LED 9*x* is not illuminated—no incoming video signal at input 10*x* respectively;

LED 9x is illuminated in green color—incoming video signal at input 10x is good and can be displayed;

LED 9x is illuminated in red—incoming video signal at input 10x is not good (not matching display or projector 2 or invalid);

LED 9x is illuminated in blue—incoming video signal at input 10x is being selected (displayed); and LED 9x is illuminated alternately in blue—input 10x selected but video signal has stopped/became invalid.

If only one good video input is available, SC 20 may automatically select that input without user intervention. This selection is communicated to main video switch 14 via control line 17. If more than one good video input is available, the user should select the appropriate input 10x by pressing its appropriate push button 8x.

To further improve device 301 usability, optional Remote Control (RC) 32 is wirelessly coupled to the SC 20 through RC receiver 30. RC receiver 30 may be Infra-Red, RF or any other short-range wireless technology. More specifically RC receiver 30 may be Bluetooth transceiver to enable remote control from smart-phone 3 or other portable device using special control application. Remote control 32 may further have bi-directional communication link with the SC 20 to provide user indications at the remote control 32 of input video status (similar to LEDs 9x).

Remote control 32 may further capable of "learning" control function from other remote controls to enable control of other devices. For example—remote controller 32 may be programmed to turn on and off a display or a projector 2 to prevent the need to use two remote controllers.

Optionally, the plurality of push buttons 8x are replaced with a single push button (not seen in this figure), wherein pressing the single push button causes SC 20 to select the next input 10x that is coupled to a valid signal in a cyclic way and change the status of the corresponding LED 9x accordingly. Optionally if only one input 10x is coupled to a valid signal, the corresponding LED 9x blinks few times to indicate that no change was made to the selected input. Optionally if no one of the inputs 10x is coupled to a valid signal, all the LEDs 9x blinks few times to indicate that no input could be selected.

FIG. 4 schematically illustrates a high-level functional diagram of another exemplary embodiment 401 of the current invention similar to the device 301 of FIG. 3 above and having an additional EDID emulator function 71.

Switching a display or projector between different sources may cause delays and settings changes in connected devices. As modern operating systems can detect changes in connected displays, it can trigger various actions that will negatively affect the user. To prevent such actions, EDID emulator function 71 coupled to video inputs 11x via lines 72x respectively couples the display EDID and Hot Plug detect lines. SC 20 reads the display or projector 2 EDID content once display 2 is connected, and copies that content into EDID emulator function 71 via serial link 73. EDID emulator function 71 emulating a standard EDID EEPROM (Electrically Erasable Programmable Read-Only Memory) to enable continuous platform access to that content (regardless of the main video switch 14 position) from all inputs 10x. EDID emulator function 71 also control the Hot Plug Detect line of each video input 10x to prevent signaling display disconnect when main video switch 14 is changing position.

The result of this setup is that each connected device (3 and 4 in this figure) assumes that the display or projector is connected to it continuously and therefore it does not change its settings.

Mobile High-Definition Link (MHL) is an industry standard for a mobile audio/video interface that allows consumers to connect mobile phones, tablets, and other portable consumer electronics (CE) devices to high-definition televisions (HDTVs) and audio receivers. The MHL 3.0 standard supports up to 4K (Ultra HD) high-definition (HD) video and 7.1 surround-sound audio, including TrueHD and DTS-HD, while simultaneously charging the connected device. MHL-enabled products include adapters, automotive accessories, AV receivers, Blu-ray Disc players, cables, DTVs, media sticks, monitors, projectors, Smartphones, tablets, TV accessories, and more.

MHL was developed by the MHL Consortium, a consortium made up of leading companies in the mobile and CE space that includes Nokia, Samsung, Silicon Image, Sony, and Toshiba.

In some embodiments of the invention, at least one of video inputs 10x supports MHL standard. For example video input connector 7e may support MHL protocol, for example (but not limited to) MHL 3.0 which provides higher resolution video link (4K2K), 10W of charging power and wider data channel. Video input port 10e may be mini-USB type compatible with MHL 3.0 standard.

VC 7e may be MHL 3.0 to HDMI bridge chip such as Silicon Image (1140 East Argues Ave; Sunnyvale, Calif. 9408, USA) SiI9394 for converting video (and optionally embedded audio) to HDMI signals. The SiI8620 MHL 3.0 transmitter IC is designed to work with the latest 4K Ultra HD capable mobile applications processors, while the SiI9394 MHL 3.0-to-HDMI 2.0 bridge IC enables connecting to legacy HDMI 1.x and new HDMI 2.0 displays and monitors. Together, they simultaneously transmit up to 4K 2160p Ultra HD resolution video and USB data through an enhance version of Silicon Image's Media Data Tunnelling (MDT) technology. The devices also feature the latest HDCP 2.2 encryption to protect premium content delivery and are backwards compatible with legacy MHL 1.0, 2.0 and HDCP 1.x standards. In addition, the SiI6031 MHL 3.0 multimedia switch IC is available for OEMs who use a single 5-pin connector in their mobile devices for both USB and MHL connections. The SiI6031 is co-located with the SiI8620 MHL 3.0 transmitter IC and supports switching between an MHL 3.0 port and two USB ports.

Additionally, connector 10e may also be connected via power line 310e to PSU 45 to (this optional power line, and other similar optional power lines, optionally powering other video input ports, are not seen in some of the drawings to reduce clutter in the drawings) to enable 10W of charging of the connected mobile device through the same port.

FIG. 5 schematically illustrates a high-level functional diagram of yet another exemplary embodiment 501 of the current invention similar to the devices 201, 301, and 401 of previous figures above having a video processing function 60 instead of main video switch 14. The use of video processor function 60 enables integration of multiple video input sources into one display or projector 2.

As an example, in this FIG. 5, the user had selected to see video source from computer 4 at display 2 background 66 and video source 3 at display 2 window 67 Picture in Picture display (PIP).

Video processor function 60 may be an ASIC, FPGA, SoC, microcontroller, DSP or any other electronic function capable of real-time video processing. Frame Buffer memory (FB) 64 coupled to video processor function 60 is used to temporarily store video frames data while in processing.

Video processor function 60 is controlled by the SC 20 via serial lines 62 to enable user setup through push-buttons 8*x* or remote controller 32.

It should be noted that video processor function 60 may drive more than one video outputs 21*a* and 21*b* to drive multiple displays 2 (second display not seen in this figure). In the depicted embodiment, output 21*a* of VP 60 is connected to both VL 22 and external wired display port 27*a*, while output 21*b* of VP 60 is connected to external wired display port 27*b*.

To reduce cluttering the figures, optional display identification line 88 is not seen here. SC 20 may monitor display ports 27*x* to automatically detect events such as connecting, disconnecting, adding or replacing a display to display ports 27*x* and may adjust the operation of VP 60 accordingly.

Optionally, video processor function 60 may perform input signal qualification and thus it may not require a separate video detector function 18 seen in FIG. 3.

Optionally, video processor function 60 may perform input signal conversion and thus it may not require a separate video conversion functions such as video conversion such as VC 7*x*, or video rescaling function such as rescaler function 77 seen in FIG. 2.

Video processor function 60 may be used to generate video background image. This image may be programmed during device production, programmed by the user, or generated in real time to display text derived by SC 20.

For example, a logo or a screen-saver image may be stored, in the device and be projected when no valid input video is available, or no input video is selected.

Additionally or alternatively, system status may be displayed, for example when no valid input video is available, or no input video is selected, or if the selected input video is not connected to a valid video signal. For example, a message may include: listing the video inputs at which valid signals are available, video signal type (e.g. High Definition (HD), 4 k, VGA, etc.) listing of the available displays, and display types, etc. Additionally or alternatively, system status may be displayed for a short time when changes of configuration are made such as connecting or disconnecting a video input or a display.

SC 20 may be coupled to the organization LAN (Local Area Network) or WLAN (Wireless Local Area Network) through LAN or WLAN network port 96 to enable dynamic generation of meeting data as background image. Such data may include: meeting name, time, participants etc. Such data may be derived from scheduler applications such as Microsoft Outlook. For example, standard messages (similar to emails) may be sent from the company or hotel server into the device via LAN or WLAN port 96. The SC function 20 receives and parses these messages to create a textual meeting display with relevant meeting information.

Additionally or alternatively, display may be generated in response to commands or data from remote controller 32.

Controlling the displayed image, for example the selecting sources for main and PIP display, location, and size of PIP, may be done via remote controller 32. Optionally, additionally or alternatively, a pointing device such as mouse 516 may be connected to SC 20, for example via USB port 529. pointing device 516 may be used for controlling the display. For controlling the display, CS 20 may generate a menu to be displayed on display 2. To allow viewing the desired video without overlaying interference, the menu may be displayed only in response to moving or clicking the mouse, or may be reduced to a single small icon when not in use.

FIG. 6 schematically illustrates a high-level functional diagram of an audio sub-system of the preferred embodiment of the current invention shown in FIGS. 2 to 5 above.

Audio is an essential aspect of meetings activities such as video projection, conference calls, presentation and training. In some cases, the audio is built-in the video protocol. For example in HDMI video input (such as 10*a* in FIGS. 2 to 5), multiple audio channels may be embedded in the video stream and then amplified and played by connected display or projector 2. In other cases audio may be supplied separately (for example in VGA or DVI video input. The preferred device of the current invention supports embedded audio channels by switching it together with the video. To support cases in which audio channels are not embedded in the video, additional audio options may be provided by the device.

Device 201,301,401,501 may further comprise an audio multiplexer 70 that combines or switches between various analog audio inputs channels 74*x*. Optionally, audio multiplexer 70 is an analog audio multiplexer. Optionally, audio multiplexer 70 is a digital audio multiplexer. Optionally, audio multiplexer 70 combines audio signals from a plurality of audio inputs channels 74*x* into a combined audio output. Optionally at least one of audio inputs channels 74*x* is a digital audio channel. Optionally audio channels are stereo channels.

In this preferred embodiment of the current invention a first audio input 75*a* coupled to the audio multiplexer 70 through audio lines 74*a* enables connection of analog audio input from external device such as media player or computer. Second audio input lines 74*b* may be coupled to internal audio sources such as optional video streamer disclosed above. Third audio input lines 74*c* is coupled to external computer device 4 through analog audio connector 81 and audio input jack 75*c*. Forth audio input line 74*d* is coupled to a Bluetooth module 83 that is coupled to antenna 82 to enable wireless audio input reception from nearby Bluetooth devices.

Audio multiplexer 70 is controlled by the SC 20 via control lines 84 to enable user selection of desired audio input. Optional remote controller 32 that is coupled to the SC 20 via remote controller receiver function 30 enables remote control of audio functions.

Optionally, audio and video channel are selected together, however it should be noted that in some cases users will want to see video from one video input channel and listen to the audio from another channel.

Audio output 666 of the audio multiplexer 70 is connected to audio injector function 85 that injects (embed) the selected audio channel into the output digital video stream. Such embedded audio stream is then coupled to the display 2 having internal amplified speakers 106*a* and 106*b*.

Optionally, analog (or digital) output jack 675, receiving audio signals from audio multiplexer 70 may be used to drive a speaker set 680. Speaker set 680 may be amplified, and may be a stereo set, or include a subwoofer, or may comply with 5.1 or 5.2 surround sound protocol, or compatible with other digital or analog audio FIG. 7 schematically illustrates a high-level functional diagram of a file transfer sub-system of the preferred embodiment of the current invention shown in FIGS. 2 to 5 above. In this figure, USB charging jacks 52*x* (only 52*a* and 52*b* are seen herein, but all 52*x* may optionally be used for this) are being used also to enable transfer of files between connected devices.

Laptop computer 4 is coupled through USB standard USB cable 93*a*, USB port 52*a*, USB data lines 54*a* to USB Device Emulator (DE) function 94*a*.

Similarly Smartphone 3 is coupled through USB standard USB cable 93*b*, USB port 52*b*, USB data lines 54*b* to USB Device Emulator function 94*b*.

USB Device Emulator function 94*x* are microcontroller, FPGA or ASIC programmed to emulate a USB mass storage device through it USB interface 54*x* respectively. A device connected to DE 94*x* sees it as a mass storage device available to copy and paste files.

Arbiter function 97 coupled to the two USB Device Emulator function 94*x* at the other side, enables shared access and read/write arbitration to one or more mass storage devices.

Preferably the at least one internal mass storage device (MSD) 98 may be SPI flash, flash drive or any other suitable volatile or non-volatile memory component.

Optionally an external device such as USB flash storage device 103 is coupled to external USB port 89. Mass storage components (98 and 103 if inserted) will be seen as shared drive from device 4 and device 3. Files may be copied through these shared drives between computers.

This function is useful to enable transfer of meeting minutes or presentations between participants having different computing devices.

According to one exemplary embodiment of the invention, ARB 97 cause the computing devices such as laptop 4 and Smartphone 3 to be able to see all the file storages in laptop 4 and Smartphone 3 MSD 98 storage device 103 (whichever is available) as a plurality of connected storage devices.

According to another exemplary embodiment of the invention, ARB 97 allows different devices with different operating systems (OS) to be able to interact and to manipulate files, for example using "click and drag" to copy and move files among the connected devices.

According to another exemplary embodiment of the invention, ARB 97 allows the connected computing devices such as computer 4 and Smartphone 3 to manipulate files only in MDS 98 and storage device 103. For example, a user of one laptop may upload a file from the laptop to the internal mass storage MSD 98. Other users, may then view, review, download the file to their connected laptop or Smartphone and edit the file. However, in this manner, the privacy of each user is maintained as he chooses which file to share by placing a copy of it at the shared storage 98 or 103, while other users cannot access files not uploaded to the shared storages 98 or 103. Filed to be shared may be loaded to storage device 103 which can be for example a Disk On Key (DOK) or an external Hard Drive (HD). Optionally at least one, and optionally a plurality of external ports 89 are connected to ARB 97, foe example for allowing using external mass storage devices using connectors and protocols other than USB.

Optionally, ARB 97 may be accessed by SC 20 (as seen in FIG. 5) and a file loaded for example into the shared storages 98 or 103 may be displayed or played on display 2. To do this, the device requires to be able to execute at least a rudimentary file reader. Since the requirement of a meeting room are modest—only to view a small number or file types such as slides or PDF files, and to be able to play video files, the computing power required is low. This option will allow a user to bring the file to the meeting room on a DOK 103 and to display it using mouse 516 without the need to bring a laptop to the meeting.

FIG. 8 schematically illustrates an external view of a preferred embodiment of the current invention shown in FIGS. 2 to 5 above.

In this embodiment of the current invention 201, 301, 401 or 501, the base plastic part 90 is shaped as circular or polygon with an outer surface 100 having AC jacks 46*x* located all around the surface to enable easy access from all sides. Powered USB ports 52*x* and their status LEDs 56*x* are also located all around the base plastic part 90. Cooling air inlet 92 located at the bottom to enable air inflow over the PSU. Air flows upwards through the optional cooling fan 55 (not shown in this figure) and exhausted at the top area in top perforated cover part 95.

The multimedia upper turret part 91 is free to rotate for example 340 degrees around the base plastic part 90 to enable access to video inputs from all sides. Optionally, the multimedia upper turret part 91 is round, for example a cylindrical or truncated cone shaped.

In an exemplary embodiment, only power is transferred from base 90 to turret 91. Not having data lines between base 90 to turret 91 reduces complexity and increases reliability. When the connection between the base 90 to turret 91 is made using wires, the rotation of turret 91 in respect to base 90 to is limited for example to for example 340 degrees. However, a slip-ring may be used to allow unrestricted rotation.

HDMI video input port 10*a* enable connection of HDMI video sources. Push button 8*a* is located at the top of turret to assure that it will be accessible from all sides around the device. Similarly LED 9*a* is located at the top to enable user visibility from all sides.

Analog audio jacks 75*x* and optional 675 are also located at the round multimedia turret part 91 to enable connection of independent analog audio sources and optional speakers.

It should be noted that optionally a non-mobile computer such as a PC or tabletop computer is attached to the devices seen in FIGS. 2 to 8. Optionally this computer may have a dedicated display, or it may use the display 2 for its operation. This computer may be used as a main computer, dedicated to the meeting room and may be used as interface between the company server, or the company LAN or the internet.

In this document, the term "microcontroller function" or other references to "function" or "functions" may refer to hardware capable of performing the logical function. The hardware may comprise one or a plurality of electronic circuitries. The hardware may be based on an ASIC (Application Specific Integrated Circuit), a processor accompanied with the necessary memory, a programmable device such as FPGA (Field Programmable Gate Array), or other device or devices capable of performing the desired function. The block diagrams seen here may refer to the function (rather then the hardware sub-units) since modern logical hardware are capable of performing several functions. Thus, a plurality of logical functions may be performed by the same hardware. Alternatively, each logical function may be performed by a dedicated hardware, for example a single chip, or several chips. A man skilled in the art of electronics may find several ways to realize and implement the "function" or "functions". All such implementations are within the scope of this invention.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A meeting room power and video center device comprising:
    a housing having an outer surface;
    an AC power input to connect said housing to a power mains;
    a plurality of AC jacks positioned on said outer surface, wherein said plurality of AC jacks are coupled to said AC power input;
    an AC to DC power supply module coupled to said AC power input;
    a plurality of DC charging jacks positioned on said outer surface, wherein said plurality of DCX charging jacks are coupled to said AC to DC power supply module;
    a plurality of video input ports positioned on said outer surface;
    at least one display port to transmit video signals to an external display;
    a video multiplexor coupling at least one video signal from at least one of said plurality of video input ports to said at least one display port; and
    an audio multiplexer coupled to a plurality of audio input channels, and having at least one output audio channel, wherein said audio multiplexer is for receiving input audio signals from said plurality of audio input channels, and for generating output audio signal based on at least one of said input audio signals to be presented in said at least the audio output channel of said audio multiplexer.

2. The meeting room power and video center device of claim 1, wherein said video processor is a video switch selectively switching one video signal from at least one of said plurality of video input ports to said at least one display port.

3. The meeting room power and video center device of claim 1, wherein said charging jacks are USB jacks.

4. The meeting room power and video center device of claim 1, further comprising a system controller for controlling said video processor.

5. The meeting room power and video center device of claim 4, further comprising:
    a user selector connected to said system controller for selecting one of said plurality of video input ports to be coupled to said at least one display port; and
    a user indication connected to said system controller for providing indication of the selected video input port.

6. The meeting room power and video center device of claim 5, wherein said user selector is in a form of a plurality of pushbuttons, wherein:
    each pushbutton from said plurality of pushbuttons is located near a corresponding video input port, and
    said user indication is in a form of a plurality of corresponding LEDs, each corresponding LED from said plurality of corresponding LEDs is located near said corresponding video input port.

7. The meeting room power and video center device of claim 5, and further comprising:
    user indication for providing indication of status of video signals coupled to said plurality of video input ports; and
    a video detector, wherein:
    said video detector is coupled to said system controller and to said plurality of video input ports for:
    detecting presence of valid video signal in any of said plurality of video input ports;
    reporting to said system controller the presence of valid video signal in any of said plurality of video input ports; and
    causing the activation of said user indication for providing indication of the current status of video signals in said plurality of video input ports.

8. The meeting room power and video center device of claim 1, further comprising at least one EDID (Extended Display Identification Data) emulator,
    said at least one EDID emulator is coupled to said at least one display port, and coupled to said plurality of video input ports,
    wherein said at least one EDID emulator is for:
    receiving EDID content from a display connected to said at least one display port; and
    emulating a standard EDID EEPROM (Electrically Erasable Programmable Read-Only Memory) to enable continuous access to said EDID content of said display connected to said at least one display port from any one of said plurality of video input ports.

9. The meeting room power and video center device of claim 1, wherein at least one of said video input ports is connected to a docking controller to support at least one protocol selected from the group of protocols comprising: USB 3.0, Thunderbolt, Lightning, and DockPort.

10. The meeting room power and video center device of claim 1, wherein at least one of said video input ports is connected to a wireless link receiver so as to wirelessly receive input video signal.

11. The meeting room power and video center device of claim 10, wherein said wireless link receiver enables video input from a portable device using at least one video protocol selected from the group of protocols comprising: DLNA (Digital Living Network Alliance), Miracast, MIMO (multiple-input and multiple-output), WHDI (Wireless High Definition Interface), Airplay, and WirelessHD.

12. The meeting room power and video center device of claim 4, further comprising a remote control receiver connected to said system controller, wherein said remote control receiver is wirelessly communicating with a remote controller to receive commands for controlling said video processor.

13. The meeting room power and video center device of claim 12, wherein said remote controller further controls at least one external device other than the meeting room power and video center device.

14. The meeting room power and video center device of claim 13, wherein said at least one external device is selected from a group of external devices comprising video display, video projector, audio speakers, audio microphone, video camera, and video camera panning actuator.

15. The meeting room power and video center device of claim 12, wherein said remote control receiver is a wireless transceiver for providing bi-directional communication with said remote controller to receive status data from said system controller; and
wherein said remote controller further comprises a display to display information derived from said status data from said system controller.

16. The meeting room power and video center device of claim 1, wherein said at least one display port is a wireless video transmitter wirelessly transmitting video signals to a matching video receiver.

17. The meeting room power and video center device of claim 1, and further comprising a video rescaler connected between said video processor and said at least one display port, wherein said video rescaler is for one of video up-scale or video down-scale, of video format of video signals received from said video processor, to match the video format of video signals compatible with a display coupled to said at least one display port.

18. The meeting room power and video center device of claim 1, wherein,
when at least two valid video signals are present in two video input ports,
said video processor integrates video signals from at least a first video input port and a second video input port from said plurality of video input ports, to a composite video signal presented at said at least one display port.

19. The meeting room power and video center device of claim 18, wherein said composite video signal presented at said at least one display port is a picture in picture (PIP) display comprising at least a first and a second picture, wherein:
said first picture is overlaid with said second picture,
said first picture is derived from video signal from said first input port, and
said second picture is derived from video signal from said second input port.

20. The meeting room power and video center device of claim 1, wherein said video processor further generates at least one video background image when at least one of the conditions is met, wherein the conditions are:
no video input was selected;
the selected video input is not connected to a valid video signal; or
no valid video signal is presented in any one of said plurality of video input ports.

21. The meeting room power and video center device of claim 1, wherein said video processor further generates a video image presenting system information.

22. The meeting room power and video center device of claim 21, wherein said video image presenting system information comprises information selected from a group of information comprising: listing the video inputs at which valid signals are available, listing video signal type, listing of the available displays, listing display types.

23. The meeting room power and video center device of claim 21, wherein said video image is displayed for a short time duration when changes of configuration are made, wherein said short time duration is between 0.2 second to 45 second.

24. The meeting room power and video center device of claim 23, wherein said changes of configuration are selected from a group changes comprising: connecting a display, disconnecting a display, connecting a video input to a video source, disconnecting a video input to a video source, and changing the selected video input source.

25. The meeting room power and video center device of claim 4, further comprising a network port connected to said system controller, wherein data received by said system controller via said network port is used for generating an image to be presented at said at least one display port.

26. The meeting room power and video center device of claim 1, wherein said audio multiplexer is an analog audio switch switching one selected audio input channel from said plurality of said input audio channels into said audio output channel.

27. The meeting room power and video center device of claim 26, further comprising an audio injector connected to said at least one audio output channel for injecting audio signals presented at said audio output channel into the video signal to be presented at said at least one display port.

28. The meeting room power and video center device of claim 27, wherein said audio injector injects digital audio data into digital video stream to be presented at said at least one display port.

29. The meeting room power and video center device of claim 1, further comprising:
a first device emulator connected to a first charging jack of said a plurality of DC charging jacks;
a second device emulator connected to a second charging jack of said a plurality of DC charging jacks;
an arbiter coupled to said first device emulator and to said second device emulator; and
at least one mass storage component, wherein said first device emulator enables data exchange of a first mobile computing device coupled to said first charging jack with said arbiter, and said second device emulator enables data exchange of a second mobile computing device coupled to said second charging jack with said arbiter, and wherein said arbiter presents said at least one mass storage component as an external disk drive to both said first mobile computing device and to said second mobile computing device.

30. The meeting room power and video center device of claim 29, wherein files may be written to and read from said at least one mass storage component by said first mobile computing device and by said second mobile computing device.

31. The meeting room power and video center device of claim 29, wherein said at least one mass storage component is internal to said housing.

32. The meeting room power and video center device of claim 29, further comprising at least one external port for connecting an external mass storage component, wherein said arbiter presents said at least one external mass storage component as an external disk drive to both said first mobile computing device and said second mobile computing device.

33. The meeting room power and video center device of claim 32, wherein said arbiter comprises a file reader for reading a file stored in said external mass storage component and convert data in said file stored in said external mass storage component to video images to be presented at said at least one display port.

34. The meeting room power and video center device of claim 1, wherein said housing comprises:
    a base having a first outer surface wherein said plurality of AC jacks and said plurality of DC charging jacks are exposed on said first outer surface; and
    a turret having a second outer surface wherein said plurality of video input ports are exposed on said second outer surface,
    and wherein said turret is connected to said base so that said turret can rotate with respect to said base.

35. The meeting room power and video center device of claim 1, wherein at least one of said plurality of video input ports is coupled to said AC to DC power supply module to provide charging of a mobile computing device connected to said at least one of said plurality of video input ports coupled to said AC to DC power supply module.

\* \* \* \* \*